June 17, 1941.  A. HENNICKE ET AL  2,246,439
STEREOSCOPIC CAMERA
Filed Nov. 3, 1938
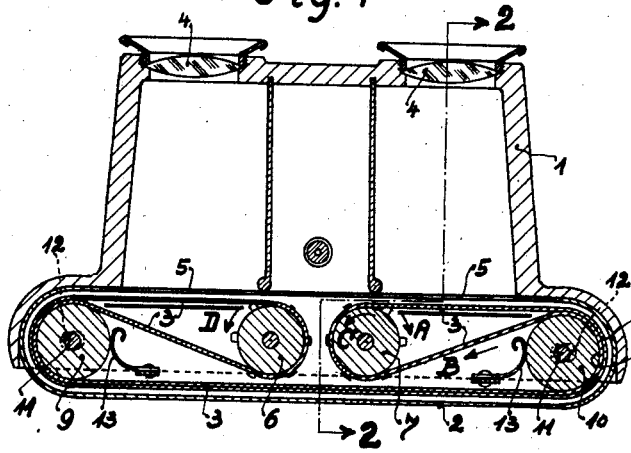
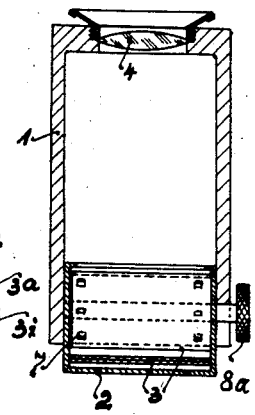
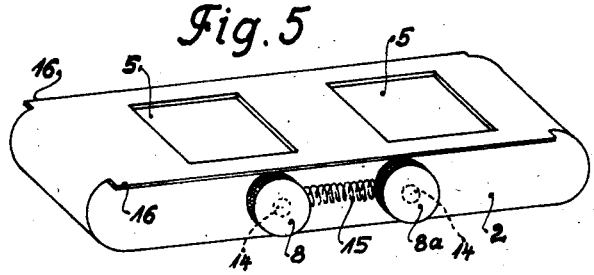
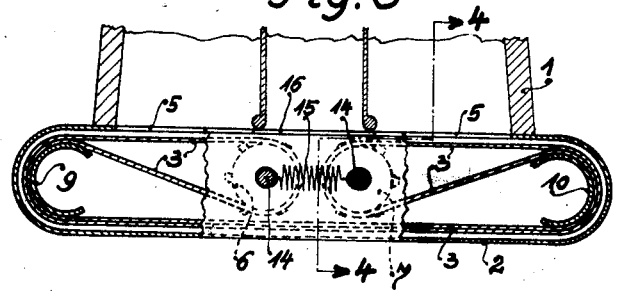
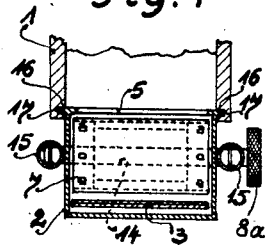
Inventors,
Alfred Hennicke.
Hugo Bossel
Frank A. Appleman
Attorney.

Patented June 17, 1941

2,246,439

UNITED STATES PATENT OFFICE 2,246,439

STEREOSCOPIC CAMERA

Alfred Hennicke and Hugo Bossel, Hamburg-Altona, Germany

Application November 3, 1938, Serial No. 238,643
In Germany February 10, 1938

4 Claims. (Cl. 95—18)

This invention relates to a film container in stereoscopic cameras.

The main feature of the invention resides in guiding an endless film over transport means which are disposed between film deflecting members. Owing to this arrangement a film can be completely utilized for taking pictures to save material and spaces between pictures may remain unexposed for subsequent use. This is important if the pictures are to be arranged in a certain order which cannot be maintained, however, when the pictures are taken. The film is kept tensioned automatically.

For viewing purposes, the endless film is separated at a suitable point and can then be moved past the objectives of a viewing apparatus.

Two embodiments of the invention are illustrated, by way of example, in the accompanying drawing, in which Figure 1 is a sectional view of one form of the film guide according to the invention, with a dark slide, in a stereoscopic camera;

Fig. 2 is a section on the line 2—2, of Fig. 1;

Fig. 3 is a partial sectional view showing the general arrangement of Fig. 1 but another type of film guide;

Fig. 4 is a section on the line 4—4, of Fig. 3; and

Fig. 5 is a diagrammatic view of the dark slide or holder for the construction shown in Figs. 3 and 4.

The dark slide 2 insertable in the body 1 of a stereoscopic camera holds an endless film strip 3 which can be exposed through the objective lenses 4. For this purpose, the dark slide is provided with two openings 5 through which light coming from the lenses 4 can pass to the film 3. The dark slide 2 contains also the film transport means 6, 7 rotatably mounted therein and fitted with the handles 8, 8a.

The transport means 6, 7 are disposed between deflecting members 9, 10 for the film 3. In the construction shown in Fig. 1 the deflecting means 9, 10 constitute rollers rotatable on the shafts 11 arranged in the walls of the holder 2. The shafts 11 rest in slotted holes 12 to permit a slight variation in their distance from the transport means 6, 7 for the purpose of keeping the film 3 constantly taut by means of springs 13 which act upon the rollers 9, 10.

As shown in Fig. 3, the deflecting means 9, 10 for the film 3 are rigidly connected with the longitudinal walls of the holder 2 and the transport means 6, 7 are displaceable relative to one another and to the deflecting means 9, 10. Tensioning of the film 3 is attained through the tension springs 15 which connects the shafts 14 of the transport means 6, 7.

The endless film 3 embraces the transport means 7, and its lower portion is then placed directly on the deflecting member 10 whence it passes to the deflecting member 9 and thence to the transport member 6 which moves it back over the film portion disposed on the deflecting member 9. From the deflecting member 9 the film 3 passes over the film portion surrounding the deflecting member 10 back to the transport means 7.

If the film 3 is to be moved past the lenses 4, the handle 8a of the transport means 7 is turned in the direction of the arrow A, whereby the outer film portion 3a on the deflecting member 10 is lifted off from the film portion 3i resting directly on the member 10 and is enabled thereby to move in the direction of the arrow B and drag along also the film portions positioned on the deflecting member 9 and the transport means 6. If the transport means 7 is turned in the direction of the arrow C, the outer film portion 3a surrounding the deflecting member 10 is pressed firmly upon the film portion 3i and the latter upon the member 10, whereby the film is prevented from rotation.

When the film 3 is to be moved in opposite direction, the handle 8 of the transport member 6 is turned in the direction of the arrow D.

As indicated in Fig. 1, the holder 2 may be inserted from the rear in the body 1 in axial direction of the lenses 4, or, as shown in Figs. 3 to 5, it may possess slides 16 and be laterally inserted in grooves 17 of the body 1 in known manner.

In order to control the motion of the film 3 and permit proper positioning thereof for the subsequent exposure of parts, the transport means 6, 7 may be connected with a counter, not shown.

We claim:

1. In a stereoscopic camera, a laterally elongated casing having a front wall provided with a pair of laterally spaced openings, a housing carried by said casing and projecting forwardly therefrom, said housing having a pair of lens openings axially alined with the first mentioned openings, a pair of guides located in the ends of said casing, a pair of rollers arranged in said casing adjacent to the transverse center of the casing on opposite sides thereof, said rollers being adapted to engage within opposed portions of an endless film and the guides being adapted to guide said film between themselves and to said rollers, means exterior of the casing for operating one of said rollers, and tensioning means for said film.

2. In a stereoscopic camera, a laterally elongated casing having a front wall provided with a pair of laterally spaced openings, a housing carried by said casing and projecting forwardly therefrom, said housing having a pair of lens openings axially alined with the first mentioned openings, a pair of guides located in the ends of said casing, a pair of rollers arranged in said casing adjacent to the transverse center of the casing on opposite sides thereof, said rollers being adapted to engage within opposed portions of an endless film and the guides being adapted to guide said film between themselves and to said rollers, means exterior of the casing for operating one of said rollers, and spring means urging said guides apart.

3. In a stereoscopic camera, a laterally elongated casing having a front wall provided with a pair of laterally spaced openings, a housing carried by said casing and projecting forwardly therefrom, said housing having a pair of lens openings axially alined with the first mentioned openings, a pair of guides located in the ends of said casing, a pair of rollers arranged in said casing adjacent to the transverse center of the casing on opposite sides thereof, said rollers being adapted to engage within opposed portions of an endless film and the guides being adapted to guide said film between themselves and to said rollers, means exterior of the casing for operating one of said rollers, said rollers being mounted for movement toward and from each other, and spring means urging the rollers toward each other.

4. In a stereoscopic camera, a laterally elongated casing having a front wall provided with a pair of laterally spaced openings, a housing carried by said casing and projecting forwardly therefrom, said housing having a pair of lens openings axially alined with the first mentioned openings, a pair of movable guides located in the ends of said casing, a pair of rollers arranged in said casing adjacent to the transverse center of the casing on opposite sides thereof, said rollers being adapted to engage within opposed portions of an endless film and the guides being adapted to guide said film between themselves and to said rollers, means exterior of the casing for operating one of said rollers, said guides being mounted for movement toward and away from each other, and spring means urging said guides away from each other.

ALFRED HENNICKE.
HUGO BOSSEL.